United States Patent [19]

Bavas

[11] Patent Number: 4,766,845
[45] Date of Patent: Aug. 30, 1988

[54] CAT LITTER PAN SYSTEM

[76] Inventor: Andrew L. Bavas, 556 W. Arlington Pl., Chicago, Ill. 60614

[21] Appl. No.: 941,723

[22] Filed: Dec. 15, 1986

[51] Int. Cl.⁴ ............................................. A01K 45/00
[52] U.S. Cl. ......................................................... 119/1
[58] Field of Search ............................................ 119/1

[56] References Cited

U.S. PATENT DOCUMENTS

| | | |
|---|---|---|
| 2,306,014 | 10/1941 | Carson ..................................... 119/1 |
| 3,085,550 | 4/1963 | Crawford ................................ 119/1 |
| 3,310,031 | 3/1967 | Lowe, Jr. ................................ 119/1 |
| 3,793,989 | 2/1974 | Clark ....................................... 119/1 |
| 3,990,397 | 11/1976 | Lowe, Jr. ................................ 119/1 |
| 4,271,544 | 6/1981 | Hammond .......................... 119/1 X |
| 4,279,217 | 7/1981 | Behringer ............................... 119/1 |
| 4,541,360 | 9/1985 | Higgins et al. .......................... 119/1 |
| 4,548,160 | 10/1985 | Feitelson ................................. 119/1 |
| 4,553,671 | 11/1985 | Cheesman .......................... 119/1 X |
| 4,627,382 | 12/1986 | Muzzey ................................... 119/1 |

Primary Examiner—Robert P. Swiatek
Assistant Examiner—R. Thomas Price

[57] ABSTRACT

A cat litter pan system consisting of a permanent extruded plastic litter receptacle suitable for receiving therein a disposable litter tray and a two component cover section that matingly engages the plastic receptacle wherein the disposable litter tray is positioned adjacently to the cover section and is easily removed, disposed of and replaced with a new one.

7 Claims, 2 Drawing Sheets

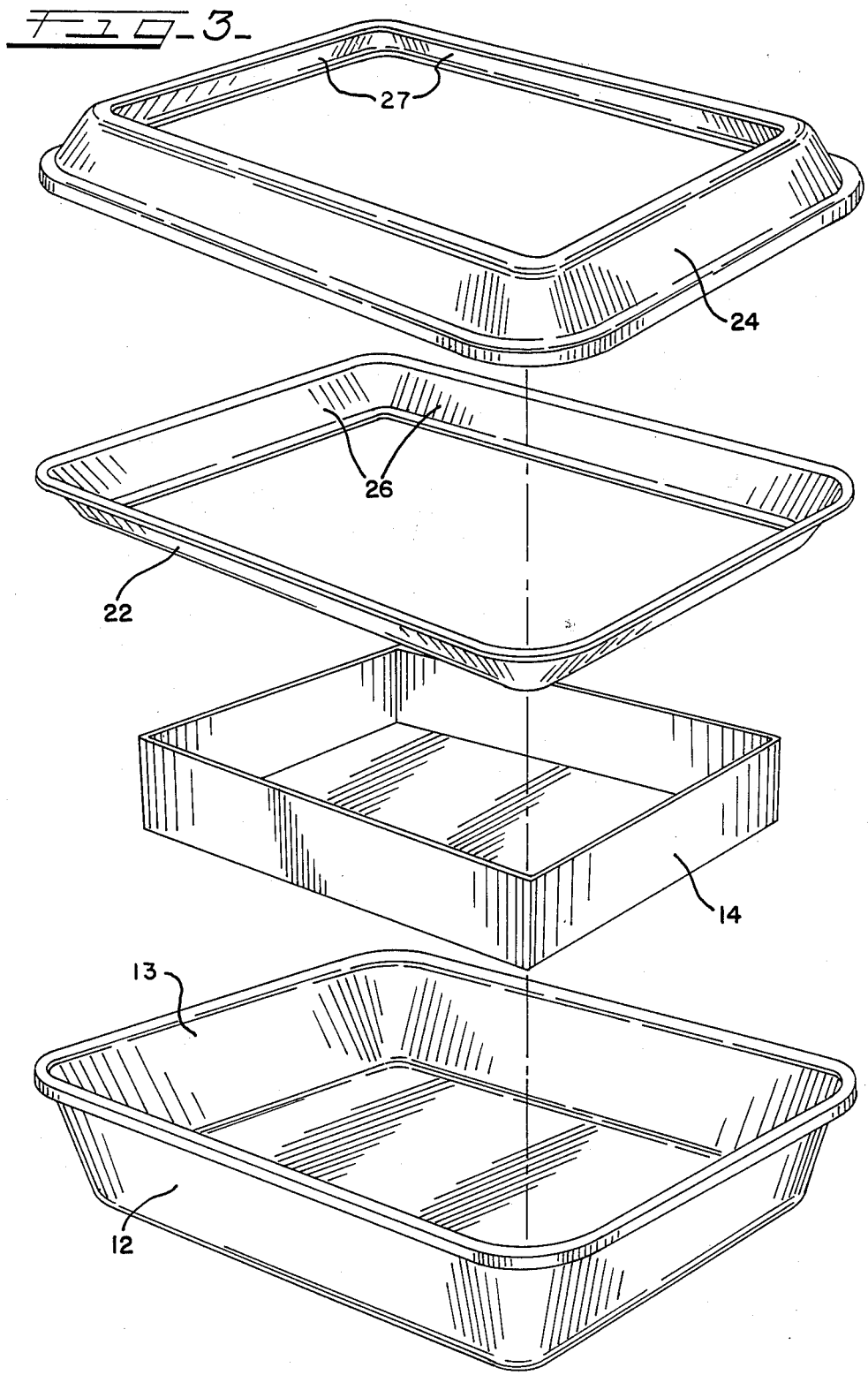

CAT LITTER PAN SYSTEM

BACKGROUND OF THE INVENTION

There are several cat litter pan products on the market all of which require a person to separately purchase a litter pan and litter. It is a messy, unpleasant and often, unsanitary procedure to change and clean the litter pan and most cat owners do not look forward to it. In fact, the litter pan should be cleaned each time the litter is changed which is time consuming. In addition, the cat has the tendency to claw or scratch at the litter before using it and in so doing causing it to fly out of the pan onto the floor. This, obviously causes an unwanted mess and is unsanitary. Also, after using the litter pan, the cat has a tendency to scratch at any available surface to clean its paws. This can also scatter litter.

There are many kinds and shapes of litter pans currently existing, however, to the best of my knowledge, there are none that incorporate a disposable litter tray suitable for easy removal and replacement with a new litter tray. My invention incorporates a disposable litter tray, containing litter, to be easily removed from a permanent litter pan and replaced with a new one. This eliminates the usual mess and unsanitary conditions that are associated with cleaning a litter pan.

BRIEF SUMMARY OF THE INVENTION

It is the object of the present invention to provide a cat litter pan system that consists of an extruded plastic litter pan holder or receptacle and a disposable litter tray that is easily replaced with a fresh one.

It is another object of the present invention to provide a cat litter pan system that eliminates litter being thrown or carried out of the box during each use.

It is another object of the present invention to provide a cat litter system wherein means are provided to enable a cat to scratch or clean its paws after each use.

It is still a further object of the present invention to provide a cat litter system wherein the used litter is easily disposed of and a new disposable litter tray inserted into the litter pan or receptacle.

It is another object of the present invention to provide an extruded plastic litter pan having a bottom section with tapered sidewalls and a cover section that engages said bottom portion.

It is still another object of the present invention to provide a cover section that comprises a lower or retaining lid, and an upper lid, said upper lid having a sufficient opening to enable a cat to freely enter and exit therefrom.

IN THE DRAWINGS

FIG. 3 is an exploded view of my cat litter pan system.

DETAILED DESCRIPTION OF THE PREFERRED EMBODIMENT

Figure 1:
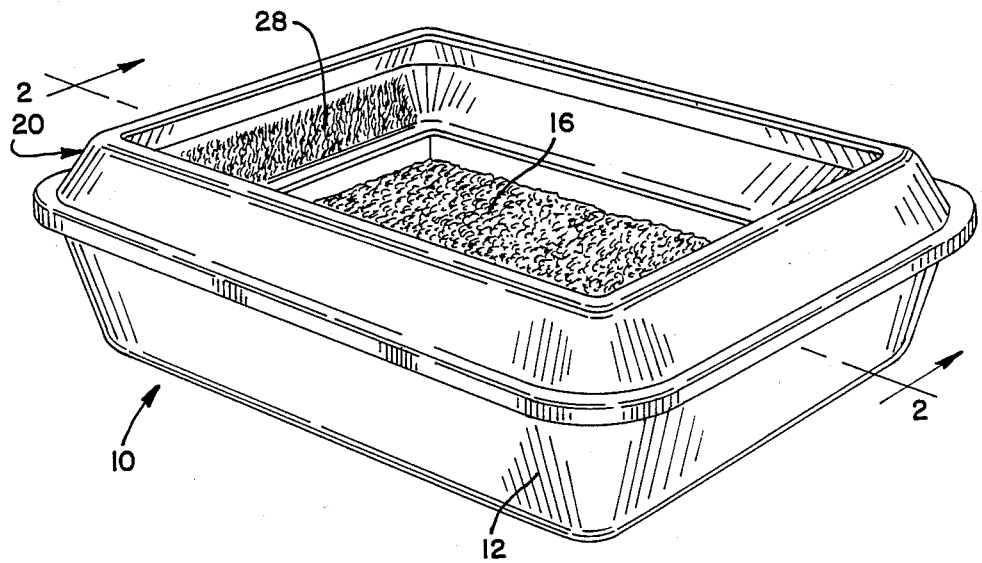
FIG. 1 is a perspective view illustrating my cat litter pan system.
Figure 2:
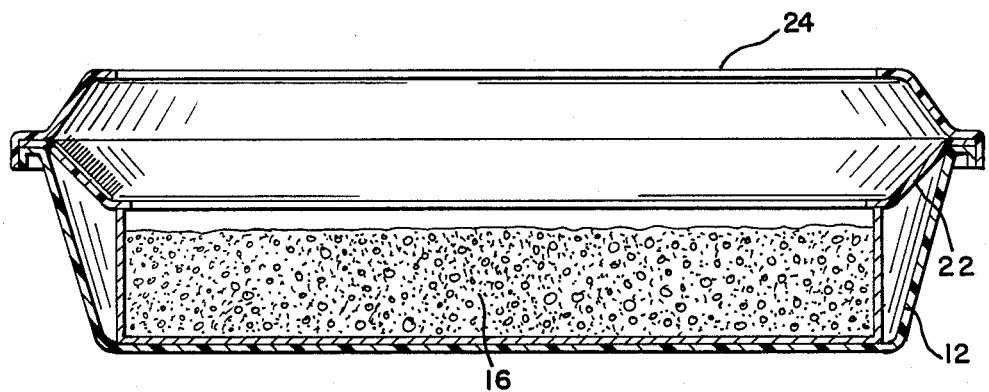
FIG. 2 is a cross sectional view of my cat litter pan system taken along lines 2—2.

The present invention relates to a cat litter pan system and more particularly, it is directed to a cat litter system 10 consisting of an extruded plastic litter receptacle or bottom pan 12 having tapered walls 13 suitable for receiving therein a disposable litter tray 14 and a cover or top section 20.

The disposable litter tray 14 is comprised of a heavy duty corrugated paperboard which is moisture proofed inside and out with a coating of wax, paraffin or plastic by means well known in the art. The tray 14 is suitable for holding approximately four pounds of dust-free, scented or unscented, litter 16. However, the amount and type of litter for the tray 14 can vary without departing from the spirit and scope of my invention. Coating the corrugated paperboard prevents moisture from seeping through and weakening the tray 14.

The litter tray 14 is filled with litter 16 which is contained therein by a plastic seal or other suitable material well known in the art but not illustrated. The plastic seal is suitable for applying print thereto and is generally applied to the tray 14 by what is commonly known in the art as the "shrink-wrap process", or by other means well known in the art.

The cover section 20 consists of a retaining or lower lid 22 and an upper lid 24. The lower lid 22 matingly engages the receptacle or bottom pan 12 while the upper or cover lid 24 matingly engages the lower lid 22, all by means well known in the art. It is understood that the cover section 20 may be of one piece rather than the two described herein without departing from the spirit and scope of the invention. If said cover section 20 is of an unitary construction it would also matingly engage the bottom pan or receptacle 12.

The upper cover lid 24 having sloping walls 27 is of extruded plastic and is designed to matingly engage the extruded lower lid 22. The upper lid 24 has an opening sufficient to enable a cat to easily enter and leave the litter tray 14 without spreading the litter 16 outside of the litter tray 14.

The lower lid 22 has sloping walls 26 directed toward the inner portion of the litter tray 14. The sloping walls 26 have positioned thereon, by means well known in the art, an artificial plastic grass scratching mat or paw cleaner 28. The purpose of the scratching mat 28 is to encourage and enable the cat to use their paws against the mat 28 rather than against other surfaces on or just outside the litter pan. However, even if the cat does kick up the litter during or after use the sloped walls 26 and 27 are designed to prevent the litter from leaving the litter tray 14. This obviously helps eliminate an extremely messy and unhealthy condition that exists with current cat litter systems.

The cat litter system 10 is further comprised of a plastic disposable bag with a self-tie drawstring well known in the art but not illustrated, for receiving the tray and soiled litter.

In use the disposable litter tray 14 is inserted into the receptacle or bottom pan 12 or thru the cover section 20 to the bottom pan 12. The upper lid 24 of the cover section 20 is then engaged with the bottom pan 12 via the lower lid 22 and the disposable litter system is ready for use.

When it is time to change the litter tray 14, the cover 20 is disengaged from the receptacle 12. The litter tray 14 with the used litter 16 is easily removed and placed into the disposable bag for disposing into the garbage. At this time a new litter tray 14 having fresh litter 16 therein is positioned into the receptacle 12. The cover section 20 is then engaged with the receptacle 12. At this time the disposable cat litter system is again ready for use. There is no fuss and no mess. My invention as described herein provides for a fast, efficient, clean and sanitary system for changing cat litter.

The disposable litter tray 14 having the plastic seal is sold as a separate item enabling a cat owner to stock a sufficient amount of fresh disposable litter trays 14. This eliminates opened bags of litter laying around that can easily spill and create an unwanted mess.

It is to be understood that the above described cat litter system is simply illustrative of the application of principles of my invention and many other modifications may be made without departing from the spirit and scope of the invention.

The embodiments of the invention in which an exclusive property or privilege is claimed are defined as follows:

1. A cat litter pan system comprising an extruded plastic receptacle, a disposable litter tray suitable for positioning within said receptacle and a two component cover section that matingly engages the plastic receptacle, said two component cover section having an upper retaining lid and a lower retaining lid, said lower retaining lid having sides that are sloped in a downwardly inward direction, wherein said inwardly directed sides are in an adjacent relationship to upper edges of the disposable litter tray, said litter tray being easily removed and disposed.

2. A cat litter pan system as described in claim 1 wherein said lower retainer lid of the cover section further comprises a paw cleaner coupled thereto.

3. A cat pan litter system as described in claim 2 wherein the sides of the upper retainer lid of the cover section are sloped in an inward direction.

4. A cat litter pan system as described in claim 3 wherein said disposable litter tray contains litter, said litter being contained in said tray by means of a plastic seal.

5. A cat litter pan system as described in claim 4 wherein said disposable litter tray is comprised of a heavy duty corrugated paperboard, wherein said paperboard is moisture proofed, thereby enabling all moisture to be contained within said tray.

6. A cat litter pan system as described in claim 5 wherein the extruded plastic receptacle has a plurality of sides sloped in an inward direction.

7. A cat litter pan system as described in claim 6 wherein the upper cover lid of the cover section contains an opening enabling a cat to easily enter and exit from said disposable litter tray.

* * * * *